(12) United States Patent
Beattie et al.

(10) Patent No.: US 7,590,952 B2
(45) Date of Patent: Sep. 15, 2009

(54) COMPACT CHIP PACKAGE MACROMODELS FOR CHIP-PACKAGE SIMULATION

(75) Inventors: Michael W. Beattie, Muenchberg (DE); Kevin Beattie, legal representative, Muenchberg (DE); Byron L. Krauter, Round Rock, TX (US); Hui Zheng, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 11/563,704

(22) Filed: Nov. 28, 2006

(65) Prior Publication Data

US 2008/0127010 A1    May 29, 2008

(51) Int. Cl.
    *G06F 17/50*    (2006.01)
(52) U.S. Cl. .......................................... 716/1
(58) Field of Classification Search ............... 716/1, 716/10, 15, 18
    See application file for complete search history.

(56) References Cited

U.S. PATENT DOCUMENTS

| | | | |
|---|---|---|---|
| 6,810,506 B1* | 10/2004 | Levy | 716/2 |
| 2003/0088393 A1* | 5/2003 | Leonhardt | 703/14 |
| 2003/0109995 A1* | 6/2003 | Mabuchi et al. | 702/64 |
| 2003/0177458 A1* | 9/2003 | Beattie et al. | 716/4 |
| 2005/0024068 A1* | 2/2005 | Van Horn et al. | 324/754 |
| 2005/0065763 A1* | 3/2005 | Beattie et al. | 703/14 |
| 2008/0072182 A1* | 3/2008 | He et al. | 716/2 |

OTHER PUBLICATIONS

Johnson, "Reduction of Very Large, Symmetric, Non-Sparse, Inductance Matrices", IEEE, 1981, pp. 20-23.

* cited by examiner

*Primary Examiner*—Jack Chiang
*Assistant Examiner*—Suchin Parihar
(74) *Attorney, Agent, or Firm*—Yee & Associates, P.C.; Casimer K. Salys

(57) ABSTRACT

A computer implemented method, data processing system, and computer usable program code are provided for reducing a chip package model. Responsive to receiving the chip package model, an inductance and a resistance of the chip package model is measured. The inductance and the resistance are measured using only a set of external nodes of the chip package model. A reduced node resistor model and a reduced node inductor model are created using the inductance and the resistance of the chip package model. A combined reduced node resistor-inductor chip package model is formed by combining the reduced node resistor model and reduced node inductor model.

20 Claims, 7 Drawing Sheets

| E1, E1 | E2, E1 | E3, E1 | E4, E1 | E5, E1 | E7, E1 |
|---|---|---|---|---|---|
| E1, E2 | E2, E2 | E3, E2 | E4, E2 | E5, E2 | E7, E2 |
| E1, E3 | E2, E3 | E3, E3 | E4, E3 | E5, E3 | E7, E3 |
| E1, E4 | E2, E4 | E3, E4 | E4, E4 | E5, E4 | E7, E4 |
| E1, E5 | E2, E5 | E3, E5 | E4, E5 | E5, E5 | E7, E5 |
| E1, E7 | E2, E7 | E3, E7 | E4, E7 | E5, E7 | E7, E7 |

| E1, E1 | E2, E1 | E3, E1 | E4, E1 | E5, E1 | E7, E1 | I1, E1 | I2, E1 | I3, E1 | I4, E1 |
|---|---|---|---|---|---|---|---|---|---|
| E1, E2 | E2, E2 | E3, E2 | E4, E2 | E5, E2 | E7, E2 | I1, E2 | I2, E2 | I3, E2 | I4, E2 |
| E1, E3 | E2, E3 | E3, E3 | E4, E3 | E5, E3 | E7, E3 | I1, E3 | I2, E3 | I3, E3 | I4, E3 |
| E1, E4 | E2, E4 | E3, E4 | E4, E4 | E5, E4 | E7, E4 | I1, E4 | I2, E4 | I3, E4 | I4, E4 |
| E1, E5 | E2, E5 | E3, E5 | E4, E5 | E5, E5 | E7, E5 | I1, E5 | I2, E5 | I3, E5 | I4, E5 |
| E1, E7 | E2, E7 | E3, E7 | E4, E7 | E5, E7 | E7, E7 | I1, E7 | I2, E7 | I3, E7 | I4, E7 |
| E1, I1 | E2, I1 | E3, I1 | E4, I1 | E5, I1 | E7, I1 | I1, I1 | I2, I1 | I3, I1 | I4, I1 |
| E1, I2 | E2, I2 | E3, I2 | E4, I2 | E5, I2 | E7, I2 | I1, I2 | I2, I2 | I3, I2 | I4, I2 |
| E1, I3 | E2, I3 | E3, I3 | E4, I3 | E5, I3 | E7, I3 | I1, I3 | I2, I3 | I3, I3 | I4, I3 |
| E1, I4 | E2, I4 | E3, I4 | E4, I4 | E5, I4 | E7, I4 | I1, I4 | I2, I4 | I3, I4 | I4, I4 |

FIG. 11

|  | CASE 1 (1102) | CASE 2 (1104) |
|---|---|---|
| CHIP PACKAGE SIZE | 26 mm x 26 mm | 34 mm x 34 mm |
| INTEGRATED CIRCUIT CHIP SIZE | 12 mm x 12 mm | 15 mm x 15 mm |
| LAYERS | 12 (3+6+3) | 12 (3+6+3) |
| EXTERNAL NODES (1106) | 28 VDD+55 VD2+80 GND | 60 VDD+53 VDD2+20 VDD3+10 VDD9+240 GND |
| TOTAL NODES (1108) | ~ 200,000 | ~ 370,000 |
| RL EXTRACTION TIME (1110) | 2 H 35 MIN (9 PARALLEL) | 2 H 22 MIN (16 PARALLEL) |
| EXTRACTED MODEL | R: 400 K<br>SELF: 234 K<br>MUTUAL: 1.9 M | R: 800 K<br>SELF: 444 K<br>MUTUAL: 4.3 M |

FIG. 14

| CHIP PACKAGE | CHIP PACKAGE TYPE | MEMORY (GB) | CPU TIME |
|---|---|---|---|
| CASE 1 (1402) | DETAILED | 7.6 | 1 H 26 MIN |
|  | REDUCED NODE | 1.2 | 16 MIN |
| CASE 2 (1404) | DETAILED | 15.6 | 3 H 28 MIN |
|  | REDUCED NODE | 2.5 | 33 MIN |

FIG. 15

| CHIP PACKAGE | CHIP PACKAGE TYPE | MAX (mv) | MIN (mv) |
|---|---|---|---|
| CASE 1 (1502) | DETAILED | 127.5 | 63.2 |
|  | REDUCED NODE | 138.4 | 69.5 |
| CASE 2 (1504) | DETAILED | 281.0 | 153.1 |
|  | REDUCED NODE | 288.4 | 148.9 |

US 7,590,952 B2

COMPACT CHIP PACKAGE MACROMODELS FOR CHIP-PACKAGE SIMULATION

BACKGROUND OF THE INVENTION

1. Field of the Invention

The present invention relates generally to the design of integrated circuits. More specifically, the present invention relates generally to a computer implemented method, data processing system, and computer usable program code for the simulation of an integrated circuit chip package.

2. Description of the Related Art

Electronic devices are rapidly becoming an integral part of everyday life in homes and industry. The brains of these devices are composed of integrated circuits, each having millions of transistors for performing the desired functionality of the device.

The cost for manufacturing an integrated circuit has increased as the number of transistors has increased and the physical size of the device has decreased. Consequently, ensuring that the design of the integrated circuit is as error-free as possible prior to proceeding to the manufacturing stage has become increasingly important. Chip package and circuit simulation serves as an important role in accomplishing this goal.

In general, the chip package couples the integrated circuit to the substrate, supplies power to the integrated circuit, and provides the signals of the integrated circuit to the substrate. The chip package may become very complex, and it is not unusual to have twenty-four or more levels of wiring.

Current methods for simulating the package are either inaccurate or take an inordinate amount of time and resources, such as computational power, memory, and storage.

SUMMARY OF THE INVENTION

The different illustrative embodiments provide a computer implemented method, data processing system, and computer usable program code for reducing a chip package model. The illustrative embodiments receive a chip package model. Responsive to receiving the chip package model, the illustrative embodiments measure an inductance and a resistance of the chip package model. The inductance and the resistance are measured using only a set of external nodes of the chip package model. The illustrative embodiments create a reduced node resistor model and a reduced node inductor model using the inductance and the resistance of the chip package model. The illustrative embodiments combine the reduced node resistor model and reduced node inductor model to form a combined reduced node resistor-inductor chip package model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 shows two resistive and inductive (RL) extraction cases in accordance with an illustrative embodiment;

FIG. 14 illustrates a comparison of memory used and central processing time usage in simulating two integrated circuit chip-chip package designs using a detailed resistor-inductor chip package model and a reduced node resistor-inductor chip package model in accordance with an illustrative embodiment;

FIG. 15 illustrates a comparison of the detected maximum and minimum on-chip transient voltage excursions in simulating two chip packages using detailed analysis and reduced node analysis in accordance with an illustrative embodiment;

DETAILED DESCRIPTION OF THE PREFERRED EMBODIMENT

Figure 1:
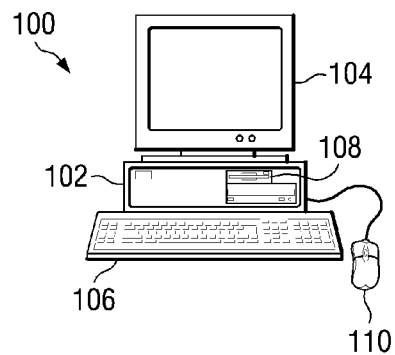
FIG. 1 shows a pictorial representation of a data processing system in which the illustrative embodiments may be implemented.

The illustrative embodiment provide for the simulation of an integrated circuit chip package. With reference now to the figures and in particular with reference to FIG. 1, a pictorial representation of a data processing system is shown in which the illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
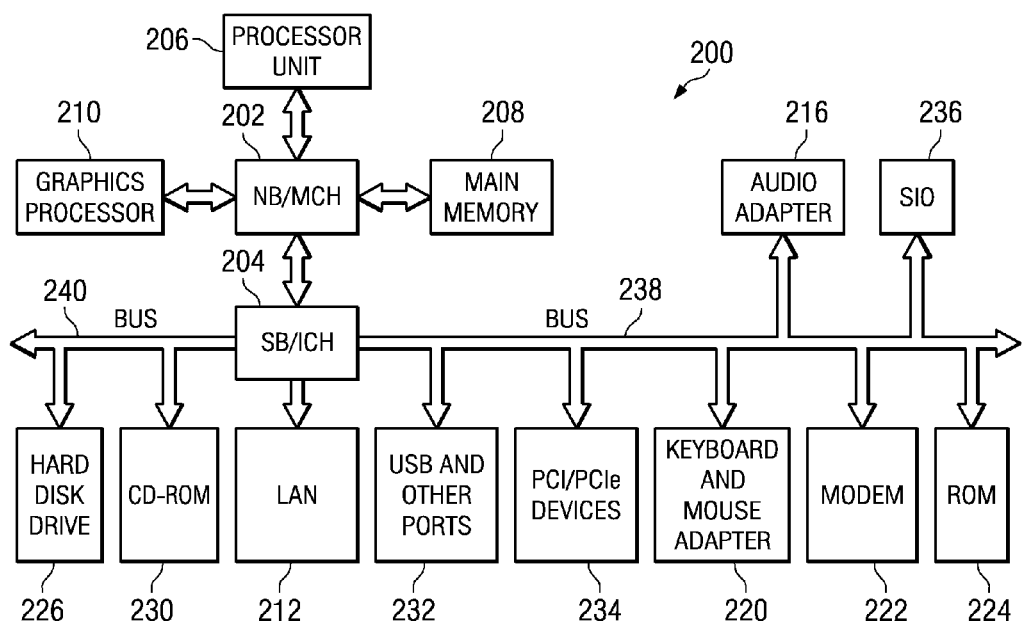
FIG. 2 depicts a block diagram of a data processing system in which the illustrative embodiments may be implemented.

Next, FIG. 2 depicts a block diagram of a data processing system in which the illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, data processing system, and computer usable program code for compiling source code and for executing code. The methods described with respect to the depicted embodiments may be performed in a data processing system, such as data processing system 100 shown in FIG. 1 or data processing system 200 shown in FIG. 2.

The primary objective of a chip package power distribution simulation is to observe potential differences (node-to-node voltages) inside the integrated circuit as a function of chip's switching activity. The package's power distribution, which may be modeled predominantly by resistive (R) elements and inductive (L) elements, is typically held constant throughout many simulations. However because complex magnetic couplings dominate the package's behavior, the package's power distribution model can overwhelm the chip-package simulation effort if the package model is not simplified a-priori. That is, the long range coupling effects of inductive models produce denser circuit models (and therefore computationally more expensive models) than that of the integrated circuit, which may be modeled predominantly by uncoupled resistive (R) and uncoupled capacitive (C) elements.

Figure 3:
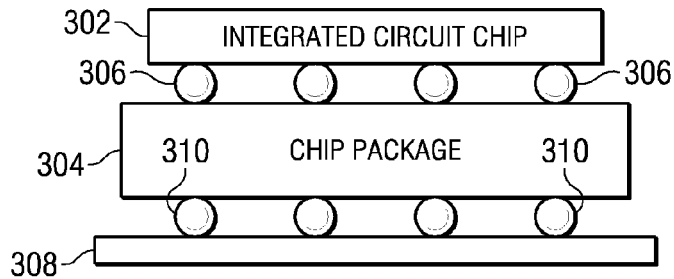
FIG. 3 illustrates a simplified view of an integrated circuit chip and its associated chip package in accordance with an illustrative embodiment.

FIG. 3 illustrates a simplified view of an integrated circuit chip and its associated chip package in accordance with an illustrative embodiment. Integrated circuit chip 302 and chip package 304 are coupled together via solder balls 306. Likewise, chip package 304 is coupled to printed circuit board 308 via solder balls 310. Chip package 304 is responsible for supplying power to integrated circuit chip 302 and for providing the signals of integrated circuit chip 302 to printed circuit board 308. Chip package 304 uses several layers of wires to supply power and signals to and from integrated circuit chip 302. The illustrative embodiments provide for the simulation of chip package 304 using an application that is executed by a data processing system, such as data processing system 200 of FIG. 2.

Figure 4:
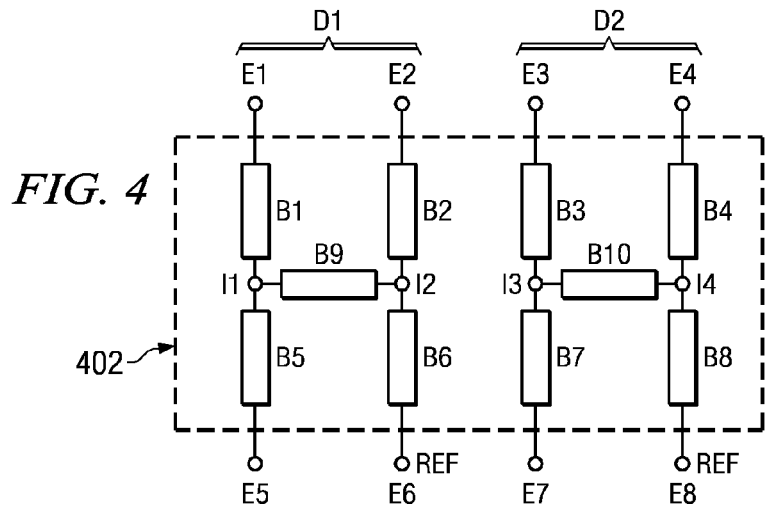
FIG. 4 illustrates an exemplary wiring of a chip package in accordance with an illustrative embodiment.

FIG. 4 illustrates an exemplary wiring of a chip package in accordance with an illustrative embodiment. Chip package 402, which is a chip package such as chip package 304 of FIG. 3, has two voltage domains D1-D2, eight external nodes E1-E8, and, when the wire segments are subdivided for either inductance and/or resistance extraction, four internal nodes I1-I4 and ten branches B1-B10.

A chip package circuit model derived from the physics alone, calculates wire segment (self and mutual) inductances and resistances. The derived chip package circuit model also connects these circuit elements using a circuit topology that matches the physical topology. That is, each inductor or resistor maps to a unique wire segment. If a physical chip package model is combined with the integrated chip circuit model, the internal package nodes must be included in the combined integrated circuit chip-chip package simulation. Moreover, when both the inductive and resistive effects are combined in a physically based chip package model, the internal package node count doubles so as to handle the series impedances, $Z=R+j\omega L$. The additional internal nodes separate the branch resistor and branch inductor elements.

While sparse inductance and sparse inverse-inductance approximations have made physical chip package models tractable, these models are still not practical because the magnetic model complexity still dominates the simulation effort. Reducing the chip package model further must exploit the fact that a modeler is not concerned with any internal package nodes in integrated circuit chip-chip package simulations.

Earlier package model reductions were aimed at removing internal nodes from a purely inductive physical chip package model. The reduction procedure began by defining a reference node for each voltage domain and shorting these reference nodes together, for the exemplary design in FIG. 4, external nodes E6 and E8 for domains D1 and D2, respectively. Next, a nodal incidence matrix (A) was produced that described the branch connectivity between nodes. Finally, the nodal incidence matrix (A) was mathematically combined with the physical branch inductance matrix (L) to create a reduced node model of the chip package. Chip package 402 is merely an exemplary chip package, that is, chip packages usually have hundreds of thousands of internal nodes and hundreds of external nodes.

Figure 5:
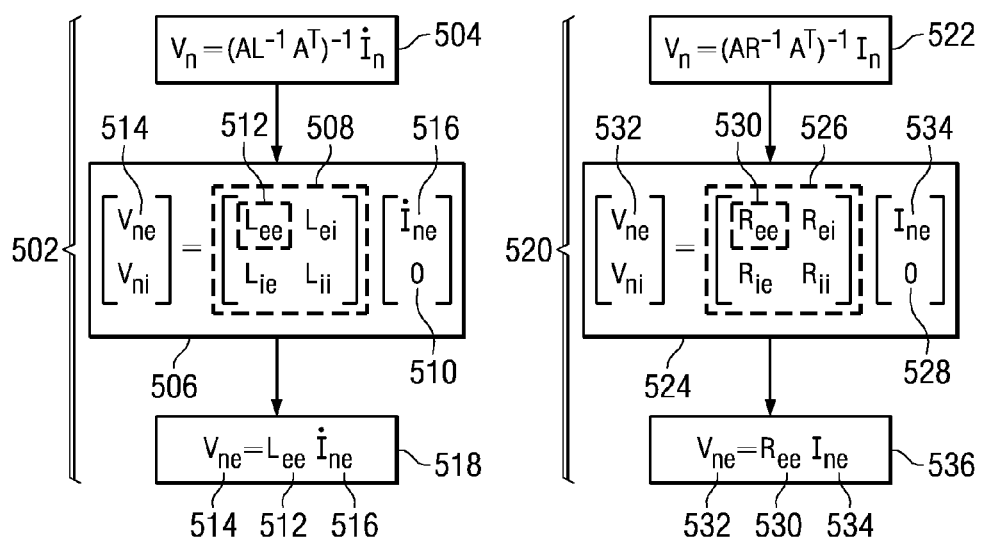
FIG. 5 illustrates a reduction process for a chip package in accordance with an illustrative embodiment.

FIG. 5 illustrates a reduction process for a chip package in accordance with an illustrative embodiment. Calculations 502 detail an inductive reduction process. In section 504 a vector of internal and external node voltages ($V_n$) is calculated by the matrix vector product of the inverse of the nodal incidence matrix (A) multiplied by the inverse of the physical branch inductance matrix ($L^{-1}$) multiplied by the transposed nodal incidence matrix ($A^T$) and the first derivative of the current applied to each node ($\dot{I}_n$). In section 506, the inductance matrix 508 is the inverse of the nodal incidence matrix (A) multiplied by the inverse of the physical branch inductance matrix ($L^{-1}$) multiplied by the transposed nodal incidence matrix ($A^T$).

Figures 6, 7, 8:
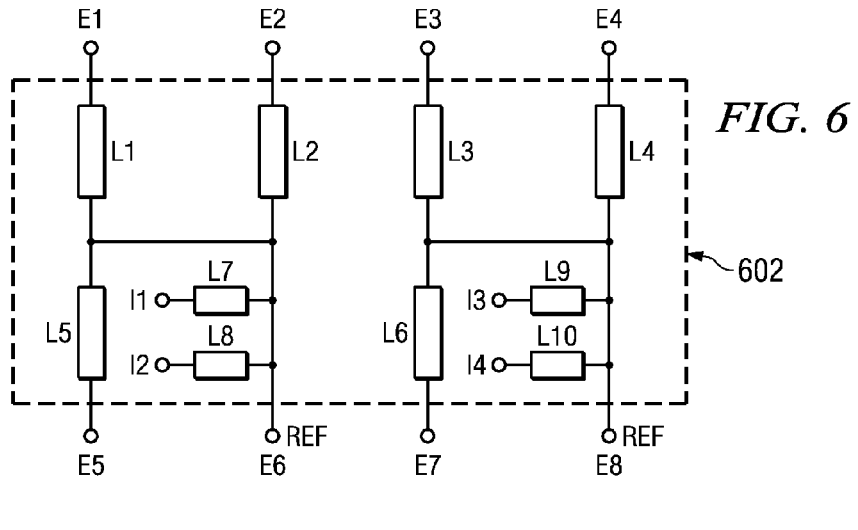
FIG. 6 illustrates realized inductive circuit topology for a chip package when used in conjunction with an inductance matrix in accordance with an illustrative embodiment.
FIG. 7 illustrates an exemplary chip package inductance matrix in accordance with an illustrative embodiment.
FIG. 8 illustrates an exemplary detailed chip package inductance matrix in accordance with an illustrative embodiment.

Again, in the circuit model using the physically extracted partial inductance matrix, every diagonal element corresponds to a unique wire segment. That is, the underlying circuit topology matches the physical topology. The diagonal elements in inductance matrix 508 no longer correspond to unique wire segments. FIG. 6 illustrates realized inductive circuit topology 602 for a chip package, such as chip package 402 of FIG. 4, when used in conjunction with inductance matrix 508 in accordance with an illustrative embodiment.

Again, the internal package nodes are not to be monitored or driven by external stimuli in subsequent simulations. That is, the internal node current sources ($\dot{I}_{ni}$) 510 are zero in both the reduction process and the subsequent integrated circuit chip-chip package simulations. Therefore, the inductance matrix 508 can be reduced to external node inductance matrix 512, such as matrix 700 of FIG. 7. FIG. 7 illustrates an exemplary chip package inductance matrix, such as inductance matrix 512 of FIG. 5, in accordance with an illustrative embodiment. Matrix 700 illustrates the inductances between external nodes E1-E5 and E7 to the common reference nodes (E6 and E8). As shown, the inductance matrix of external nodes E1-E5 and E7 creates a smaller six by six matrix. Thus, external node voltages ($V_{ne}$) 514 are given by the matrix vector product of the external node inductance matrix 512 multiplied by the external current source ($\dot{I}_{ne}$) 516 as shown in section 518.

FIG. 8 illustrates an exemplary detailed chip package inductance matrix, such as inductance matrix 508 of FIG. 5, in accordance with an illustrative embodiment. Matrix 800 illustrates the inductances between external nodes E1-E5, E7, and internal nodes I1-I4 to the common reference node (E6 and E8). As shown, inductance matrix 512 creates a ten by ten matrix.

Figure 9:
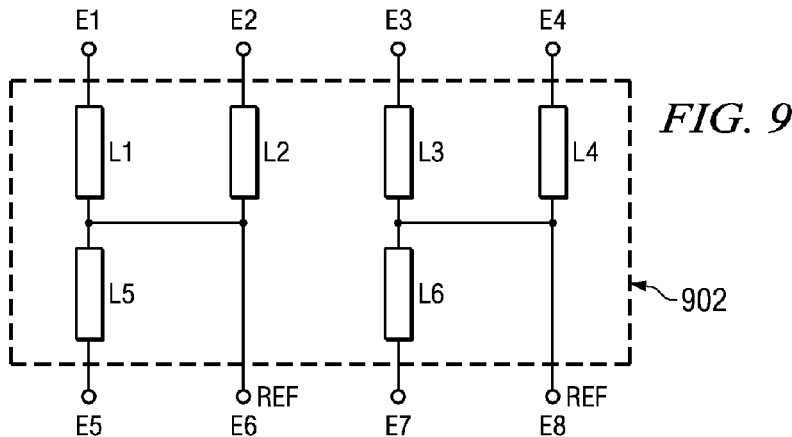
FIG. 9 illustrates the circuit model topology for the external node matrix for an exemplary chip package in accordance with an illustrative embodiment.

FIG. 9 illustrates the circuit model topology 902 for the external node matrix for the exemplary chip package in FIG. 7 in accordance with an illustrative embodiment. The matrix elements in FIG. 7 describe the magnetic couplings between the six branch elements L1-L6.

Again, earlier work focused on creating a purely reduced order inductive model. While the chip package's inductive behavior is still important, the chip package's resistive behavior cannot be ignored with today's high power integrated circuits in which direct current (DC) losses both rival in magnitude and mitigate transient drops.

Combining both the chip package's resistive and inductive behavior in a manner identical to that of the earlier works is mathematically impossible. Because the branch series impedance is complex, $Z=R+j\omega L$, the resulting expression $(AZ^{-1}A^T)^{-1}$ is frequency dependent and does not yield frequency independent resistors and inductors.

Figure 10:
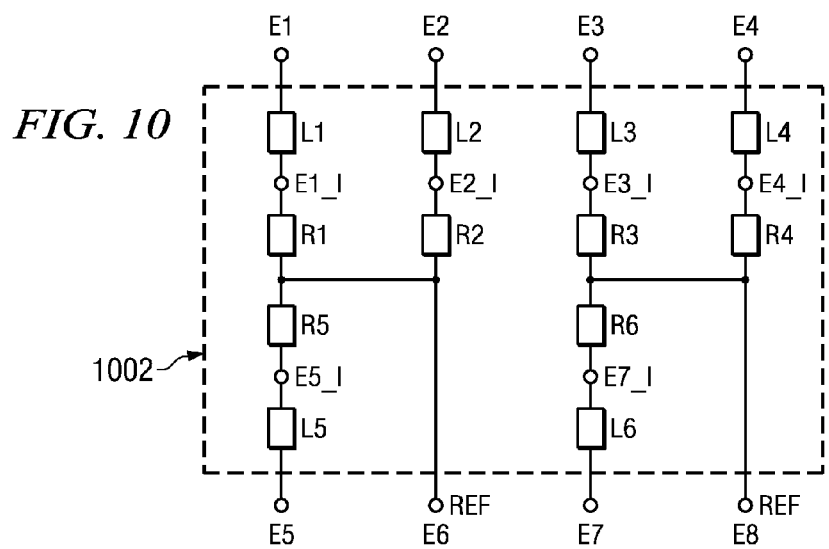
FIG. 10 illustrates the circuit model topology for a combined model of a chip package in accordance with an illustrative embodiment.

However, a useful approximate model can be made using separately reduced purely inductive and resistive models. Briefly summarized, the steps include first removing the internal nodes from a purely inductive model as in the earlier work, next similarly removing the internal nodes from a purely resistive model, and finally combining the reduced resistive model with that of the reduced inductive model. FIG. 10 illustrates the circuit model topology 1002 for a combined model for exemplary chip package 402 of FIG. 4 in accordance with an illustrative embodiment. The magnetic couplings are described by six branch inductive elements L1-L6 and the resistive couplings are described by six branch resistive elements R1-R6. Inductances L1-L6 are inductively mutually coupled, and resistances R1-R6 are resistively mutually coupled. For exemplary chip package 402 of FIG. 4, the reduced node circuit matrix would be a twelve by twelve block diagonal matrix as the resistors are not coupled to the inductors.

Returning to FIG. 5, the creation of a reduced purely resistive model parallels that of the creation of a reduced purely inductive model and is summarized in calculations 520. Similar to the reduction of a purely inductive model, in section 522, a vector of node voltages ($V_n$) is calculated by the matrix vector product of the inverse of the node incidence matrix (A)

multiplied by the inverse of the resistive matrix ($R^{-1}$) multiplied by the transposed node incidence matrix ($A^T$) and the current applied to each node ($I_n$). In section 524, the inverse of the node incidence matrix (A) multiplied by the inverse of the resistance matrix ($R^{-1}$) multiplied by the transposed node incidence matrix ($A^T$) is represented by resistance matrix 526 of all external and internal nodes, such as matrix 800 of FIG. 8.

Again, the internal package nodes are not to be monitored or driven by external stimuli in subsequent simulations. That is, the internal node current sources ($I_{ni}$) 528 are zero in both the reduction process and the subsequent integrated circuit chip-chip package simulations. Therefore, resistance matrix 526 can be reduced to external node resistance matrix 530, such as matrix 700 of FIG. 7. Thus, external node voltages ($V_{ne}$) 532 are given by the matrix vector product of external node resistance matrix 530 multiplied by external current source ($I_{ne}$) 534 as shown in section 536.

That the reduced resistive and reduced inductive models can be combined according to circuit topology 1002 in FIG. 10 is evident in the frequency limits of operation. When direct current (DC) voltage is applied, the inductors reduce to short circuits and the combined model reduces to the purely resistive model. At high frequencies where jωL>>R, the combined model closely approximates the purely inductive model.

The reduced node resistive and inductive models described for chip package 402 of FIG. 4 may be trivially combined because both employ circuit topology 902 depicted in FIG. 9 for chip package 402 in FIG. 4. The combined reduced node resistor-inductor circuit model topology 1002 depicted in FIG. 10 for chip package 402 in FIG. 4 is created by replacing the single element branches in circuit topology 902 with branches comprised of serially connected resistor-inductor elements.

This process begins by arbitrarily selecting one reduced node model (resistive or inductive) to form the top circuit elements and the other to form the bottom circuit elements. For chip package 402 in FIG. 4, the top circuit elements are inductors L1-L6 that connect external nodes E1-E5 and E7 in FIG. 10 while the bottom circuit elements are resistors R1-R6 that connect to reference nodes E6 and E8 in FIG. 10. Internal nodes E1_I-E5_I and E7_I provide for the serial connections of top and bottom circuit elements. Stamping the top circuit elements into the combined model means retaining their external node names but renaming their reference nodes to the internal nodes. Stamping the bottom circuit elements means renaming their external nodes into these same internal nodes but retaining their domain specific reference node names. The suffix I is used in FIG. 10 to indicated how this renaming might be kept consistent between top and bottom circuit elements.

As stated previously, chip packages usually have hundreds of thousands of internal nodes and hundreds of external nodes. FIG. 11 shows two resistive and inductive (RL) extraction cases 1102 and 1104 in accordance with an illustrative embodiment. Extraction cases 1102 and 1104 are for chip packages, such as chip package 402 of FIG. 4. Resistive and inductive (RL) extraction case 1102 shows external node 1106 count of 163 external nodes and total node 1108 count of approximately 200,000 nodes. Resistive and inductive (RL) extraction 1104 shows external node 1106 count of 383 external nodes and total node 1108 count of approximately 370,000 nodes. Resistive and inductive (RL) extraction case 1102 also indicates resistive and inductive (RL) extraction time 1110 of two hours and thirty-five minutes. Resistive and inductive (RL) extraction case 1104 indicates resistive and inductive (RL) extraction time 1110 of two hours and twenty-two minutes.

Figure 12:
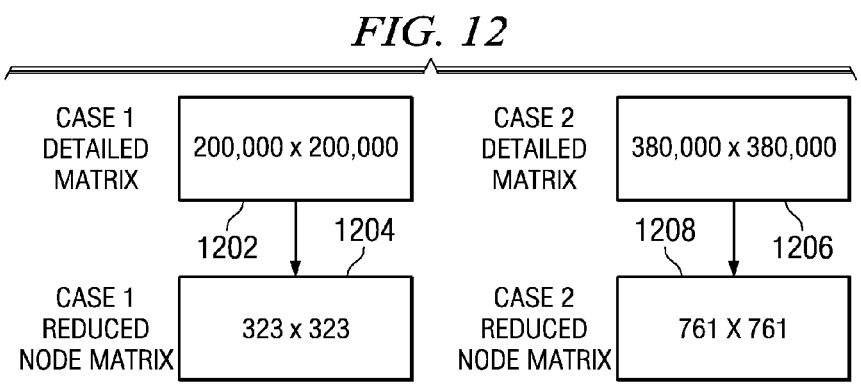
FIG. 12 illustrates a reduction of detailed combined inductance and resistance package models using both internal and external nodes in accordance with an illustrative embodiment.

FIG. 12 illustrates a reduction of detailed combined inductance and resistance package models using both internal and external nodes in accordance with an illustrative embodiment. The model size reduction inherent in the reduction of an inductance matrix, such as inductance matrix 508 of FIG. 5, to an external node inductance matrix, such as external node inductance matrix 512 of FIG. 5, and the reduction of a resistance matrix, such as resistance matrix 526 of FIG. 5, to and external node resistance matrix, such as external node resistance matrix 530 of FIG. 5, and the combination of these two reduced node matrices, is exemplified by the total nodes and external nodes of two extraction cases, such as extraction cases 1102 and 1104 of FIG. 11. With reference to FIG. 11, using the 200,000 total nodes of case 1, a detailed combined inductance and resistance package model forms a 200,000 by 200,000 matrix, shown as case 1 detailed matrix 1202. Using only the 163 external nodes of case 1, the combined reduced node inductance and resistance package model forms a 323× 323 matrix, shown as case 1 reduced node matrix 1204. The combined reduced node inductance and resistance matrix size is calculated by multiplying the number of external nodes by two and then subtracting the number of voltage domains. For example, with reference to case 1102 of FIG. 11, there are 163 external nodes and 3 voltage domains (VDD, VD2, and GND, which results in ((163*2)-3))=323. For the 370,000 total nodes of case 2, a detailed combined inductance and resistance package model forms a 370,000 by 370,000 matrix, shown as case 2 detailed matrix 1206. Using only the 383 external nodes of case 2, the combined reduced node inductance and resistance package model forms a 761×761 matrix, shown as case 2 reduced node matrix 1208.

Figure 13:
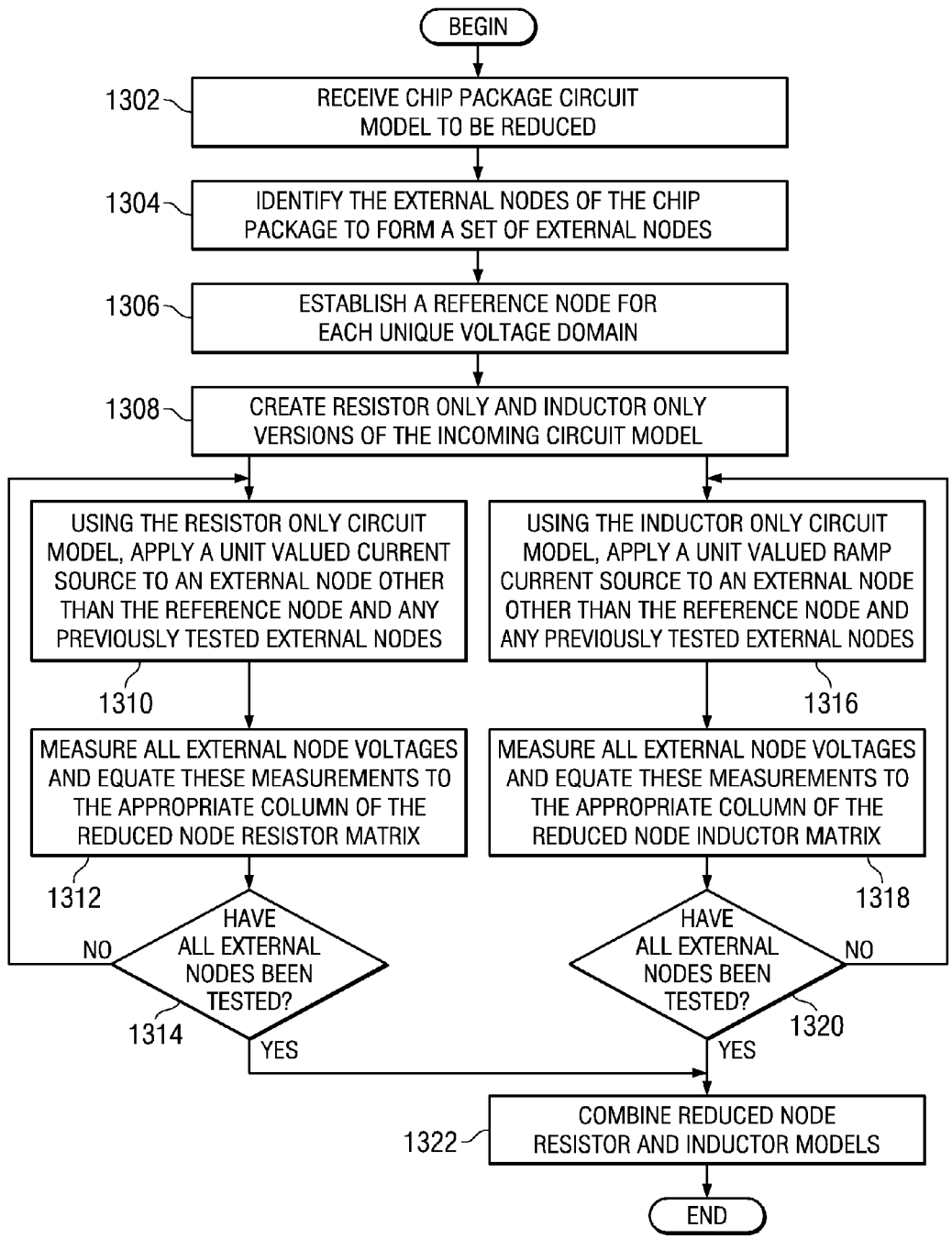
FIG. 13 is a flowchart of the operation performed to create a reduced integrated circuit chip package model in accordance with an illustrative embodiment.

FIG. 13 is a flowchart of the operation performed to create a reduced integrated circuit chip package model in accordance with an illustrative embodiment. As the operation begins, the simulation application receives a chip package circuit model, such as chip package 402 of FIG. 4, that is to be reduced (step 1302). The reduction application identifies the external nodes of the chip package to form a set of external nodes (step 1304). The reduction application then establishes one external node for each voltage domain as a reference node (step 1306). Establishing the reference node may be done automatically by the reduction application or the reduction application may receive the identification of the reference node from an external input. Then, the reduction application creates a resistor only and inductor only version of the incoming circuit model (step 1308). This operation is performed by shorting the self inductors and removing the mutual inductors in the former case and shorting the resistors in the latter case. In both cases, any capacitors present are removed. Then, the reduction application tests the resistor only circuit model and the inductor only circuit model separately to form a reduced node resistor model and a reduced node inductor model.

For the resistor only circuit model, the reduction application applies a unit valued current source to one of the remaining set of external nodes as long as the external node is not the reference node and is not a node where the current source has been applied previously (step 1310). The external node voltages are measured and these measurements are assigned to the appropriate column of the reduced node resistor matrix (step 1312). The reduction application tests, for the resistor only circuit model, conclude when the unit valued current source has been applied individually to each external node (step 1314).

For the inductor only circuit model, the reduction application applies a unit valued ramp current source to one of the remaining set of external nodes as long as the external node is not the reference node and is not a node where the current source has been applied previously (step 1316). The external node voltages are measured and these measurements are assigned to the appropriate column of the reduced node inductor matrix (step 1318). The reduction application tests, for the inductor only circuit model, conclude when the unit valued ramp current source has been applied individually to each external node (step 1320).

Because the current sources in the above tests are either unit valued DC sources, in the resistor cases, or unit valued ramp sources, in the inductor cases, performing these node voltage measurements creates an external node resistance and external node inductance matrix, such as external node resistance matrix 530 and external node inductance matrix 512 of FIG. 5.

If at steps 1314 or 1320, all of the set of external nodes have not had the appropriate ramp or DC current source applied, the operation returns to step 1310 or 1316 respectively. If at steps 1314 and 1320, all of the set of external nodes have had the appropriate ramp or DC current source applied and external node measurements performed, the chip package model reduction operation proceeds to combine the reduced node resistor and reduced node inductor models to form a combined reduced node chip package model (step 1322), with the operation terminating thereafter.

FIG. 14 illustrates a comparison of memory used and central processing time usage in simulating two integrated circuit chip-chip package designs using a detailed resistor-inductor chip package model and a reduced node resistor-inductor chip package model in accordance with an illustrative embodiment. The analysis for two chip packages is performed, case 1 1402 and case 2 1404, which are the same chip packages as case 1 1102 and case 2 1104 illustrated in FIG. 11. For case 1 1402, detailed analysis, which uses external and internal package nodes, used 7.6 gigabytes of memory and took one hour and twenty-six minutes of central processing unit time. Conversely, reduced node chip package model analysis for case 1 1402 only used 1.2 gigabytes of memory and took only sixteen minutes of central processing unit time. For case 2 1404, detailed analysis, which uses external nodes and internal nodes, used 15.6 gigabytes of memory and took three hours and twenty-eight minutes of central processing unit time. Conversely, reduced node chip package model analysis for case 2 1404 only used 2.5 gigabytes of memory and took only thirty-three minutes of central processing unit time. As illustrated, using reduced node chip package models in integrated circuit chip-chip package power distribution analysis provides a faster means of simulating the power distribution of an integrated circuit chip-chip package design while reducing the memory used and central processing unit time required.

FIG. 15 illustrates a comparison of the detected maximum and minimum on-chip transient voltage excursions in simulating two chip packages using detailed analysis and reduced node analysis in accordance with an illustrative embodiment. The analysis for two chip packages is performed, case 1 1502 and case 2 1504, which are the same chip packages case 1 1102 and case 2 1104 illustrated in FIG. 11. For case 1 1502, detailed analysis, which uses external nodes and internal nodes, detected a maximum voltage of 127.5 millivolts and a minimum voltage of 63.2 millivolts. Conversely, reduced node analysis for case 1 1502 detected a maximum voltage of 138.4 millivolts and a minimum voltage of 69.5 millivolts. For case 2 1504, detailed analysis, which uses external nodes and internal nodes, detected a maximum voltage of 281.0 millivolts and a minimum voltage of 153.1 millivolts. Conversely, reduced node analysis for case 2 1504 detected a maximum voltage of 288.4 millivolts and a minimum voltage of 148.9 millivolts. As illustrated, using reduced node analysis provides a faster means of simulating the power distribution of a chip package while providing results that are close to the detailed analysis.

Figure 16:
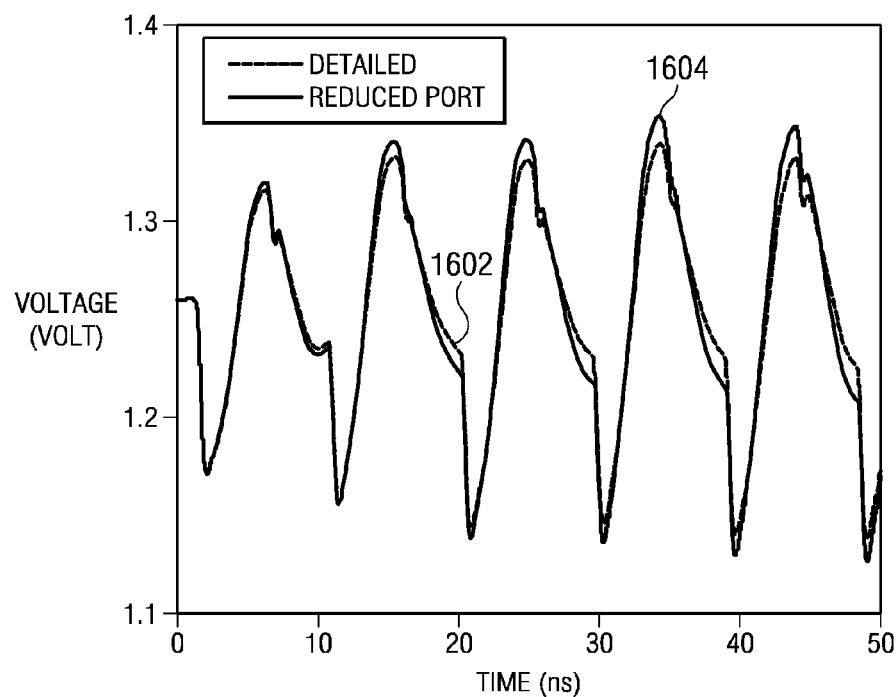
FIG. 16 shows a graphical representation of the on-chip node-to-node transient voltage excursions simulated using detailed analysis and reduced node analysis for the case 1 chip package in accordance with an illustrative embodiment.

FIG. 16 shows a graphical representation of the on-chip node-to-node transient voltage excursions simulated using detailed analysis and reduced node analysis for the case 1 chip package in accordance with an illustrative embodiment. The analysis shown is for chip package case 1 1102 illustrated in FIG. 11. Graph 1600 illustrates the detected on-chip node-to-node voltage for one pair of chip power and chip ground nodes using detailed analysis and reduced node analysis. Graph 1602 illustrates the on-chip node-to-node voltage using detailed analysis, which uses external nodes and internal package nodes, over a 50 nanosecond period. Graph 1604 illustrates the on-chip node-to-node voltage using reduced node analysis over a 50 nanosecond period. As can be seen, using reduced node chip package models provides a faster means of simulating the power distribution of an integrated circuit chip-chip package while reducing the memory used and central processing unit time required.

Figure 17:
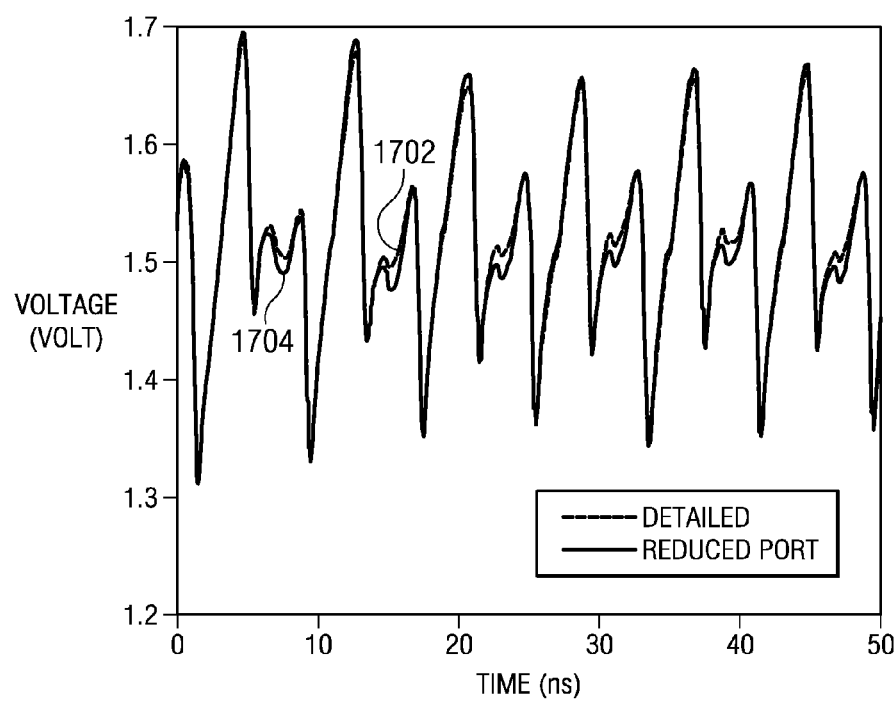
FIG. 17 shows a graphical representation of the on-chip node-to-node transient voltage excursions simulated using detailed analysis and reduced node analysis for the case 2 chip package in accordance with an illustrative embodiment.

FIG. 17 shows a graphical representation of the on-chip node-to-node transient voltage excursions simulated using detailed analysis and reduced node analysis for the case 2 chip package in accordance with an illustrative embodiment. The analysis shown is for chip package case 2 1104 illustrated in FIG. 11. Graph 1700 illustrates the detected on-chip node-to-node voltage for one pair of chip power and chip ground nodes using detailed analysis and reduced node analysis. Graph 1702 illustrates the on-chip node-to-node voltage using detailed analysis, which uses external nodes and internal package nodes, over a 50 nanosecond period. Graph 1704 illustrates the on-chip node-to-node voltage reduced node analysis over a 50 nanosecond period. As can be seen, using reduced node chip package models provides a faster means of simulating the power distribution of an integrated circuit chip-chip package while reducing the memory used and central processing unit time required.

Thus, the illustrative embodiments provide for reducing a chip package model. A chip package model is received and, responsive to receiving the chip package model, an inductance and a resistance of the chip package model is measured. The inductance and the resistance are measured using only a set of external nodes of the chip package model. A reduced node resistor model and a reduced node inductor model are created using the inductance and the resistance of the chip package model. A combined reduced node resistor-inductor chip package model is formed by combining the reduced node resistor model and reduced node inductor model.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reducing a chip package model, the computer implemented method comprising:

responsive to receiving the chip package model, creating an inductor model of the chip package model and a resistor model of the chip package model, using a computer;

measuring a plurality of inductance node voltages of the inductor model of the chip package model, wherein the inductance node voltages are measured using only a set of external nodes of the inductor model of the chip package model, and wherein the measured inductance node voltages are used to form a reduced node inductance matrix;

measuring a plurality of resistance node voltages of the resistor model of the chip package model, wherein the resistance node voltages are measured using only the set of external nodes of the resistor model of the chip package model, and wherein the measured resistance node voltages are used to form a reduced node resistance matrix;

creating a reduced node inductor model and a reduced node resistor model from the inductance matrix and the resistance matrix, respectively; and combining the reduced node resistor model and the reduced node inductor model to form a combined reduced node resistor-inductor chip package model.

2. The computer implemented method of claim 1, wherein measuring the inductance node voltages of the inductor model of the chip package model comprises:

identifying the set of external nodes for a set of voltage domains in the inductor model of the chip package model;

identifying a first external node in each of the set of voltage domains in the set of external nodes to form a set of common reference nodes;

applying a unit valued ramp current source to a non-reference external node in the set of external nodes to form a unit valued ramp current source node; and measuring a voltage from the unit valued ramp current source node to all remaining non-reference external nodes to create one row or column of an inductance matrix.

3. The computer implemented method of claim 1, wherein measuring the resistance node voltages of the resistor model of the chip package model comprises:

identifying the set of external nodes for a set of voltage domains in the resistor model of the chip package model;

identifying a first external node in each of the set of voltage domains in the set of external nodes to form a set of common reference nodes;

applying a unit valued current source to a non-reference external node in the set of external nodes to form a unit valued current source node; and measuring a voltage from the unit valued current source node to all remaining non-reference external nodes to create one row or column of a resistance matrix.

4. The computer implemented method of claim 2, further comprising:

repeating the applying step and the measuring step for all of the set of external nodes except for the set of common reference nodes to complete the inductance matrix.

5. The computer implemented method of claim 3, further comprising:

repeating the applying step and the measuring step for all of the set of external nodes except for the set of common reference nodes to complete the resistance matrix.

6. The computer implemented method of claim 1, wherein combining the reduced node resistor model and the reduced node inductor model to form the combined reduced node resistor-inductor package model comprises:

selecting one of the reduced node inductor model or the reduced node resistor model to form a first reduced node circuit model;

forming bottom elements of a series of connected resistor-inductor branches using the first reduced node circuit model;

selecting the other reduced node model to form a second reduced node circuit model;

forming top elements of the series of connected resistor-inductor branches using the second reduced node circuit model;

renaming non-reference external nodes of the first reduced node circuit model into a set of internal node names; and renaming common reference nodes of the second reduced node circuit model to the set of internal node names, wherein a set of resistors and a set of inductors are serially connected if the set of resistors and the set of inductors share a common external node name in their respective reduced node circuit model.

7. The computer implemented method of claim 1, wherein the chip package model is at least one of a sparse inductance chip package model or a sparse inverse-inductance chip package model.

8. The computer implemented method of claim 1, wherein the chip package model is an integrated circuit chip package model.

9. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive a chip package model; create an inductor model of the chip package model and a resistor model of the chip package model in response to receiving the chip package model; measure a plurality of inductance node voltages of the inductor model of the chip package model, wherein the inductance node voltages are measured using only a set of external nodes of the inductor model of the chip package model, and wherein the measured inductance node voltages are used to form a reduced node inductance matrix; measure a plurality of resistance node voltages of the resistor model of the chip package model, wherein the resistance node voltages are measured using only the set of external nodes of the resistor model of the chip package model, and wherein the measured resistance node voltages are used to form a reduced node resistance matrix; create a reduced node inductor model and a reduced node resistor model from the inductance matrix and the resistance matrix, respectively; and combine the reduced node resistor model and the reduced node inductor model to form a combined reduced node resistor-inductor chip package model.

10. The data processing system of claim 9, wherein the processing unit executing the set of instructions to measure the inductance node voltages of the inductor model of the chip package model comprises the processing unit executes the set of instructions to identify the set of external nodes for a set of voltage domains in the inductor model of the chip package model; identify a first external node in each of the set of voltage domains in the set of external nodes to form a set of common reference nodes; apply a unit valued ramp current source to a non-reference external node in the set of external nodes to form a unit valued ramp current source node; and measure a voltage from the unit valued ramp current source node to all remaining non-reference external nodes to create one row or column of an inductance matrix.

11. The data processing system of claim 9, wherein the processing unit executing the set of instructions to measure the resistance node voltages of the resistor model of the chip package model comprises the processing unit executes the set of instructions to identify the set of external nodes for a set of voltage domains in the resistor model of the chip package model; identify a first external node in each of the set of voltage domains in the set of external nodes to form a set of common reference nodes; apply a unit valued current source to a non-reference external node in the set of external nodes to form a unit valued current source node; and measure a voltage from the unit valued current source node to all remaining non-reference external nodes to create one row or column of a resistance matrix.

12. The data processing system of claim 10, wherein the processing unit executes the set of instructions to repeat the applying step and the measuring step for all of the set of external nodes except for the set of common reference nodes to complete the inductance matrix.

13. The data processing system of claim 11, wherein the processing unit executes the set of instructions to repeat the applying step and the measuring step for all of the set of external nodes except for the set of common reference nodes to complete the resistance matrix.

14. The data processing system of claim 9, wherein the processing unit executing the set of instructions to combine the reduced node resistor model and the reduced node inductor model to form the combined reduced node resistor-inductor package model comprises the processing unit executes the set of instructions to select one of the reduced node inductor model or the reduced node resistor model to form a first reduced node circuit model; form bottom elements of a series of connected resistor-inductor branches using the first reduced node circuit model; select the other reduced node model to form a second reduced node circuit model; and form top elements of the series of connected resistor-inductor branches using the second reduced node circuit model; rename non-reference external nodes of the first reduced node circuit model into a set of internal node names; and rename common reference nodes of the second reduced node circuit model to the set of internal node names, wherein a set of resistors and a set of inductors are serially connected if the set of resistors and the set of inductors share a common external node name in their respective reduced node circuit model.

15. A computer program product comprising:
a computer-readable storage medium including computer-readable program code, which when executed by a computer, provides for reducing a chip package model, the computer program product including:
computer usable program code for receiving the chip package model;
computer usable program code for creating an inductor model of the chip package model and a resistor model of the chip package model in response to receiving the chip package model;
computer usable program code for measuring a plurality of inductance node voltages of the inductor model of the chip package model, wherein the inductance node voltages are measured using only a set of external nodes of the inductor model of the chip package model, and wherein the measured inductance node voltages are used to form a reduced node inductance matrix;
computer usable program code for measuring a plurality of resistance node voltages of the resistor model of the chip package model, wherein the resistance node voltages are measured using only the set of external nodes of the resistor model of the chip package model, and wherein the measured resistance node voltages are used to form a reduced node resistance matrix;
computer usable program code for creating a reduced node inductor model and a reduced node resistor model from the inductance matrix and the resistance matrix, respectively; and
computer usable program code for combining the reduced node resistor model and the reduced node inductor model to form a combined reduced node resistor-inductor chip package model.

16. The computer program product of claim 15, wherein the computer usable program code for measuring the inductance node voltages of the inductor model of the chip package model includes:
computer usable program code for identifying the set of external nodes for a set of voltage domains in the inductor model of the chip package model;

computer usable program code for identifying a first external node in each of the set of voltage domains in the set of external nodes to form a set of common reference nodes;

computer usable program code for applying a unit valued ramp current source to a non-reference external node in the set of external nodes to form a unit valued ramp current source node; and computer usable program code for measuring a voltage from the unit valued ramp current source node to all remaining non-reference external nodes to create one row or column of an inductance matrix.

17. The computer program product of claim 15, wherein the computer usable program code for measuring the resistance node voltages of the resistor model of the chip package model includes:

computer usable program code for identifying the set of external nodes for a set of voltage domains in the resistor model of the chip package model;

computer usable program code for identifying a first external node in each of the set of voltage domains in the set of external nodes to form a set of common reference nodes;

computer usable program code for applying a unit valued current source to a non-reference external node in the set of external nodes to form a unit valued current source node; and computer usable program code for measuring a voltage from the unit valued current source node to all remaining non-reference external nodes to create one row or column of a resistance matrix.

18. The computer program product of claim 16, further including:

computer usable program code for repeating the applying step and the measuring step for all of the set of external nodes except for the set of common reference nodes to complete the inductance matrix.

19. The computer program product of claim 17, further including:

computer usable program code for repeating the applying step and the measuring step for all of the set of external nodes except for the set of common reference nodes to complete the resistance matrix.

20. The computer program product of claim 15, wherein the computer usable program code for combining the reduced node resistor model and the reduced node inductor model to form the combined reduced node resistor-inductor package model includes:

computer usable program code for selecting one of the reduced node inductor model or the reduced node resistor model to form a first reduced node circuit model;

computer usable program code for forming bottom elements of a series of connected resistor-inductor branches using the first reduced node circuit model;

computer usable program code for selecting the other reduced node model to form a second reduced node circuit model;

computer usable program code for forming top elements of the series of connected resistor-inductor branches using the second reduced node circuit model;

computer usable program code for renaming non-reference external nodes of the first reduced node circuit model into a set of internal node names; and computer usable program code for renaming common reference nodes of the second reduced node circuit model to the set of internal node names, wherein a set of resistors and a set of inductors are serially connected if the set of resistors and the set of inductors share a common external node name in their respective reduced node circuit model.

* * * * *